(12) United States Patent
Kim

(10) Patent No.: US 7,184,528 B2
(45) Date of Patent: Feb. 27, 2007

(54) METHOD FOR INPUTTING INTERNET ADDRESS USING A KEYPAD

(75) Inventor: Pil-Jun Kim, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 501 days.

(21) Appl. No.: 10/131,360

(22) Filed: Apr. 24, 2002

(65) Prior Publication Data

US 2003/0012360 A1    Jan. 16, 2003

(30) Foreign Application Priority Data

Apr. 24, 2001    (KR) ............................... 2001-22036

(51) Int. Cl.
*H04M 11/00*    (2006.01)
(52) U.S. Cl. ............................................. 379/100.14
(58) Field of Classification Search ............ 379/88.17, 379/90.02, 100.13, 100.14, 90.01
See application file for complete search history.

(56) References Cited

U.S. PATENT DOCUMENTS 6,292,172 B1 *  9/2001  Makhlouf .................. 345/157
6,526,133 B1 *  2/2003  Izaki et al. ............ 379/142.17

* cited by examiner

*Primary Examiner*—Curtis Kuntz
*Assistant Examiner*—Alexander Jamal
(74) *Attorney, Agent, or Firm*—The Farrell Law Firm

(57) ABSTRACT

A method for entering an Internet site address including a plurality of Internet sub-addresses for wirelessly accessing an Internet website using a keypad of a mobile communication terminal is disclosed. According to the method, at least one Internet sub-address is assigned to at least one key of a plurality of keys arranged on the keypad in accordance with a predetermined sequence and the assigned Internet sub-address associated with the corresponding key is stored into a memory unit. If a key on the keypad is selected by a user of the mobile communication terminal, it is determined the number or time duration the key is depressed, the stored Internet sub-address corresponding to the number or time of depressing the key is retrieved from the memory unit, and transferred to a display unit for displaying the Internet site address.

6 Claims, 5 Drawing Sheets

METHOD FOR INPUTTING INTERNET ADDRESS USING A KEYPAD

PRIORITY

This application claims priority to an application entitled "Method for Inputting Internet Address Using A Keypad" filed in the Korean Industrial Property Office on Apr. 24, 2001 and assigned the Serial No. 2001-22036, the contents of which are hereby incorporated by reference.

BACKGROUND OF THE INVENTION

1. Field of the Invention

The present invention relates generally to digital mobile communication systems, and in particular, to a method for entering an address of a desired Internet website into a mobile communication terminal for wireless accessing Internet data networks using the terminal's keypad.

2. Description of the Related Art

Mobile communication systems generally refer to different telecommunication systems for providing personal wireless data transmission to subscribers who roam the system area. In addition to conventional speech transmission, the digital mobile communication systems provide a diversity of other services: short message services, facsimiles, data transmission, etc. Of these, the data transmission service particularly provides the mobile subscriber with a choice of wirelessly accessing almost all data services of fixed networks. Use of the Internet data network in fixed networks is increasing very rapidly. In the meantime, the communication environment in state of the art communications system is changing very rapidly in both fields of wireless and wired communication systems over international networks as well as in local networks. In particular, the third generation mobile communications system, e.g., such as IMT-2000 (International Mobile Telecommunication-2000) system will require the communication environment most suited to provide the mobile subscriber with a high-speed transfer of a diversity of information data services. Further, the recent developments in the technology of mobile communication systems, inter alia, mobile communication terminals or mobile telephones, e.g., such as cellular phones, PCS (Personal Communication Service) phones, or IMT-2000 terminals, are trending toward providing the capability of the various information/data services via Internet access on the mobile terminals as well as the conventional speech communications.

Of the various functions in such a mobile communication terminal, the use of Internet access is one of the more widely requested functions by mobile subscribers due to the convenience of wireless Internet access. For example, when a mobile subscriber intends to access the Internet using his or her mobile terminal, he or she will depress the Internet access shortcut key that is disposed on the mobile terminal or select a window for Internet service from a function menu displayed thereon, and then enter a desired Internet site address to establish wireless access via Internet network to retrieve any target information or data stored in one or more Internet server computers. The number of mobile subscribers using such an Internet data service with the mobile communication terminals is rapidly increasing, as the latest improvement in the technology of mobile communication allows the mobile terminals to access large amounts of data at high speeds.

Conventional mobile communication terminals are very small and compact, sized small enough to be placed on a user's palm for the sake of convenience and portability in use. In most cases mobile communication terminals have a limited number, e.g., a dozen or so, of numeric keys and/or function keys. Hence, for the purpose of entering a specified command or function into the mobile terminal from the user, a kind of multiple key assignment system is preferred, with more than one character (alphabetic) or symbol and at least one numeral being simultaneously assigned to a single key. The corresponding character or numeral is determined or identified according to the number or duration that a key is depressed (i.e., selected) by the user.

FIG. 1 shows the construction of a keypad in a conventional mobile communication terminal, on which a multiplicity of numeric keys are provided. Each numeric key is assigned multiple, e.g. three or more, alphabetical characters (or Korean phoneme characters, not shown in the drawing), in which the corresponding character or numeral is respectively selected for inputting to the mobile terminal according to the number or duration of time of depressing each specified numeric key by the user By the way, most of the addresses of Internet sites generally include several digits of characters or numerals. For example, if the user is to enter "www." in the Internet address input mode on his mobile phone using the above keypad, then he would have to repeat a sequence of key manipulations consisting of firstly depressing a numeric key "9" for "W", waiting a short time for the cursor to move to the right, or causing the cursor to move to the left digit using an arrow key for moving the cursor, and then again selecting the alphabetical character "w". As a result, it would be considerably annoying and take much input time for the user to enter his desired Internet site address using a keypad configured in accordance with the prior art.

SUMMARY OF THE INVENTION

It is, therefore, an object of the present invention to provide a simpler and more convenient method for entering an address of specified Internet sites using a keypad of a mobile communication terminal.

It is another object of the present invention to provide a method for more conveniently entering an address of specified Internet sites by means of respectively assigning sub-addresses of the Internet sites frequently used by a mobile subscriber to a set of predetermined keys on the keypad of a mobile communication terminal.

To achieve the above and other objects, the present invention provides a method for entering an Internet site address, including a plurality of Internet sub-addresses, for wirelessly accessing an Internet website using a keypad of a mobile communication terminal, comprising the steps of: assigning at least one Internet sub-address to at least one key of a plurality of keys arranged on the keypad in accordance with a predetermined sequence; storing the assigned Internet sub-address associated with the corresponding key into a memory unit; if a key depression onto at least one key in the keypad is made by a user of the mobile communication terminal, determining the number and/or time that said key is depressed; retrieving the stored Internet sub-address corresponding to the number or time of depressing the key from the memory unit; and transferring the Internet sub-address to a display unit for displaying the Internet site address.

Preferably, the Internet sub-addresses include Top Level Domain (TLDs) names, such as generic domains that represent a kind, attribute or authority (e.g., .com, .org, .net, .edu, .gov, .mil, .int, etc.) and country codes (such as .fr, .jp, .uk, .us, etc.) defined for the associated Internet host computer. Preferably, the Internet sub-addresses may include sub-addresses such as "www." representing World Wide Web.

More preferably, the Internet sub-addresses assigned to the respective keys of the keypad may be defined by either the mobile communication terminal manufacturer or the user for frequently used in Internet sites.

Preferably, the steps for entering the Internet site address are carried out in an Internet address input mode activated in response to the user's request for accessing an Internet website.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 2:
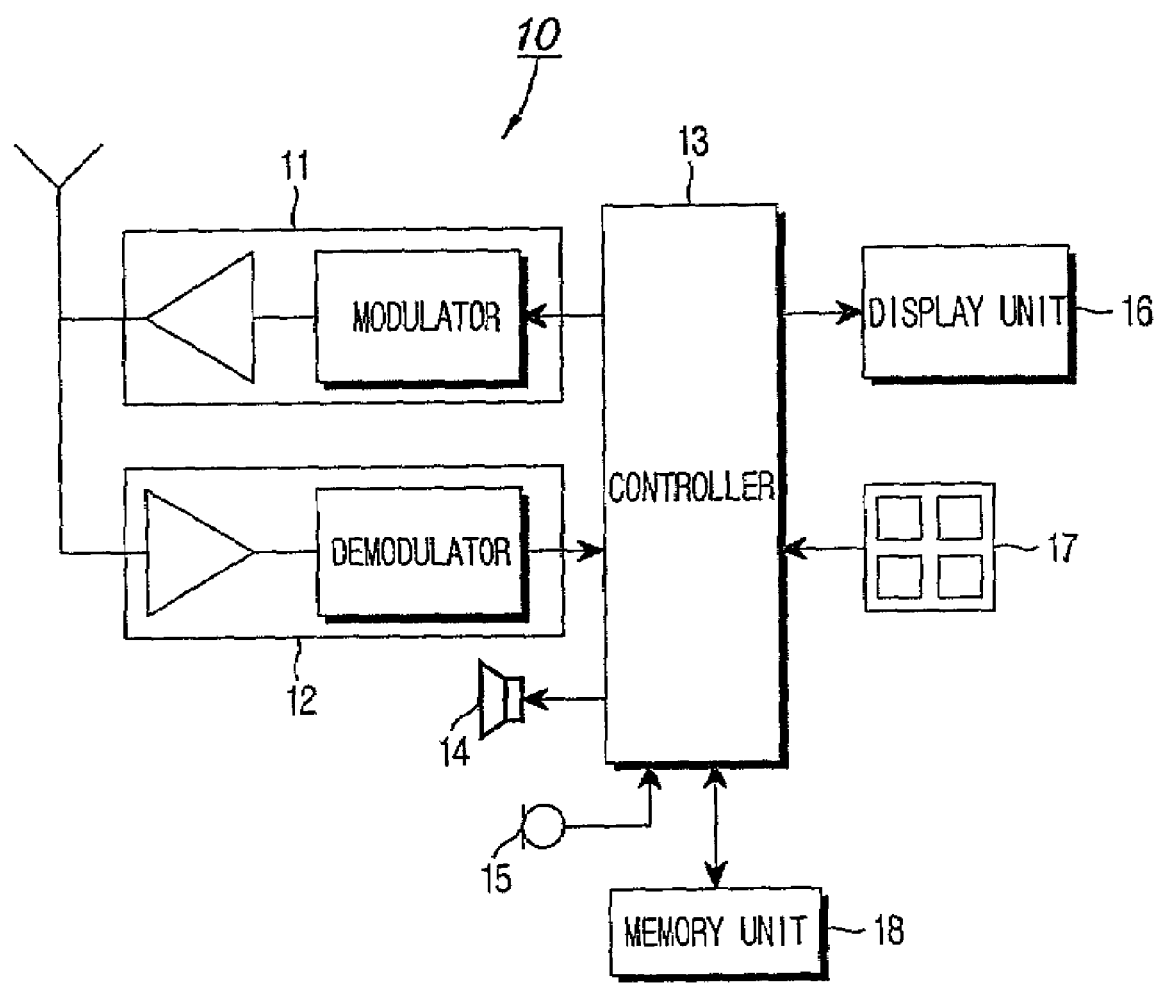
FIG. 2 is a block diagram of a mobile communication terminal applicable in the present invention.

Referring to FIG. 2, a block diagram of a mobile communication terminal applicable in the present invention is shown. The mobile communication terminal 10 includes a transmitter circuit 11 having therein a modulator and a transmitting amplifier, and a receiver circuit 12 having therein a demodulator and a receiving amplifier, for the purpose of wireless communications with a specified base station which serves to associate the mobile terminal 10 with a mobile communication system including at least one mobile switching center and an Interworking Function (IWF) center. A display unit 16 may include a liquid crystal display (LCD) panel in order to display various data generated upon the desired operation of the mobile terminal or the various information retrieved from a specified Internet site. A keypad 17 is provided with a plurality of function keys used for enabling one or more of the various functions, inclusive of a calling function, serviceable in the mobile phone and a set of numeric/character keys for entering telephone numbers, names, Internet addresses, etc. A controller 13 may include a digital signal processor, a microprocessor, and other associated peripheral circuits, designed for the purpose of making all the operational control for the receiver circuit 12 and the transmitter circuit 11, or other circuitry, so as to carry out speech communication with another party through a speaker 14 and a microphone 15. In particular, the controller 13 executes a sequence of operations based on a specified operating program to enter an Internet address using keypad 17 in accordance with the present invention. A memory unit 18 may include a read only memory (ROM) and a random access memory (RAM) for storing a plurality of operating program codes and predetermined data and a voice memory, in particular storing the specified set of operating programs to implement the method for inputting a desired Internet address using keypad 17 according to the present invention. In the memory unit 18 are further stored a plurality of numeric/character key codes and/or plurality of Internet site sub-addresses arranged according to a predetermined order for a respective key provided on the keypad 17. Here, the term "Internet site sub-address" is referred to as a part or parts of a single full Internet address selected by the user according to the present invention, such as, for example, the title information of a specified Internet service, a name or nature of Internet service authority, TLDs, generic domains, country codes, etc.

For a better understanding of the present invention, a brief description will be firstly made of a general concept applied in the invention before making a detailed description of the preferred embodiment disclosed. The searching of information via the Internet is usually carried out using a URL (Uniform Resource Locator). As is well known in the art, the most preferred addressing format of the Internet World Wide Web (WWW) servers is a URL, which is a kind of logical address standardized to represent various resources in the Internet efficiently, corresponding in general to an Internet site address for a host computer to be accessed. Such an Internet site address may conventionally consist of a plurality of sub-addresses including a first sub-address indicative of a kind of Internet service provided, for example, "www", a second sub-address indicative of a name of its host computer authority, for example, ".samsung", a third sub-address indicative of a kind or attribute of its TLD or host computer authority, for example, ".co", ".com", ".org", ".net", ".ac" and so on, and/or a fourth sub-address indicative of a country code, e.g., ".kr", ".us" or ".uk", and so on.

Of these sub-addresses, the first one, i.e., "www" is the most common prefix for Internet site addresses. Further, the subscribers of mobile terminals used within the territory of Korea would be apt to frequently use Internet site addresses including the sub-address such as, for example, ".kr". Therefore, the present invention is characterized in that one or more sub-addresses of those Internet site addresses in more frequent use of the mobile subscriber are being assigned and put into memory to one or more of numeric/character keys on a keypad 17 of his mobile terminal 10, and then a corresponding Internet sub-address is inputted concurrently according to the number or time duration of depressing the associated key.

Figure 3:
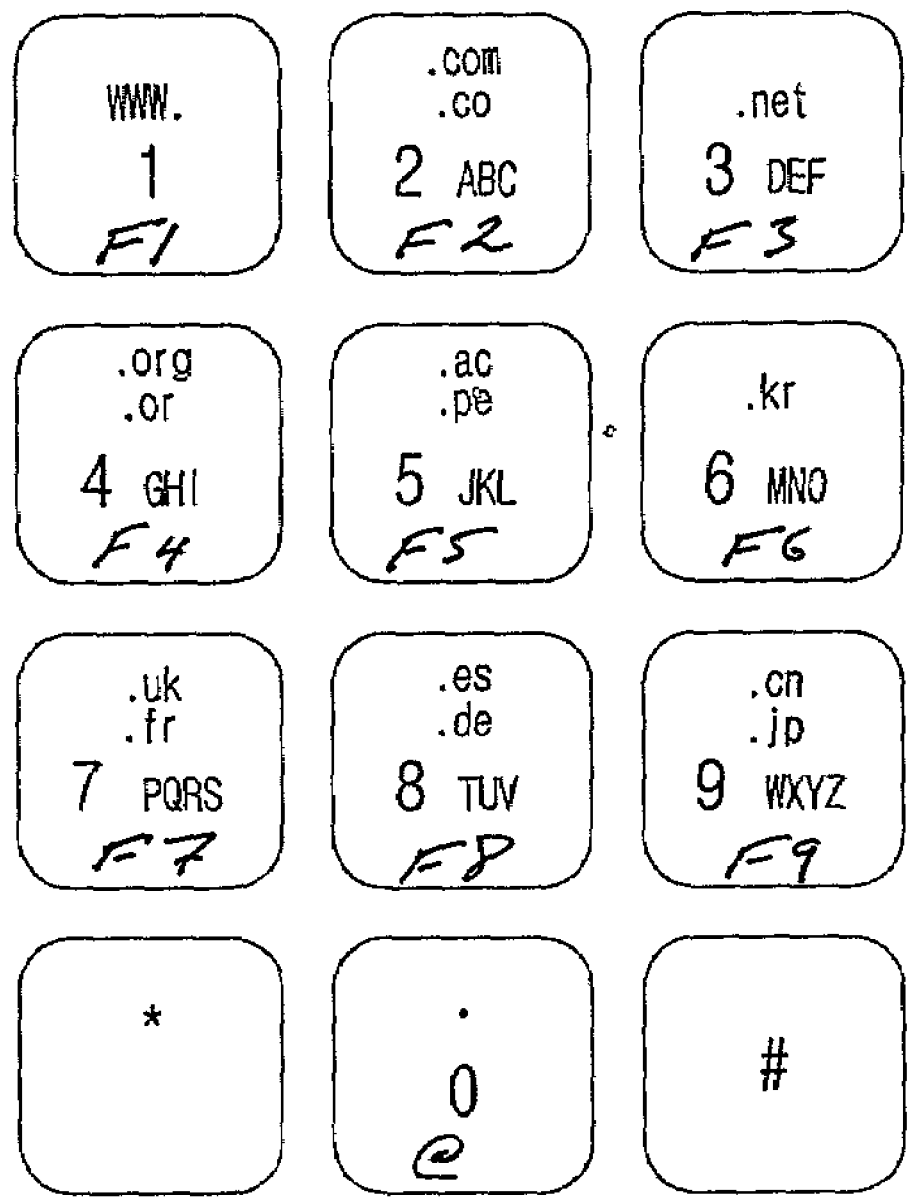
FIG. 3 is a schematic diagram showing the arrangement of a keypad according to a preferred embodiment of the present invention.

Referring now to FIG. 3, the exemplary arrangement of the keypad 17 of FIG. 2 in the mobile terminal according to a preferred embodiment of the present invention is shown. According to this arrangement, and, by way of example, the keypad 17 is configured so that numeric key "1" is assigned the sub-address "www.", numeric key "2" is assigned the sub-addresses ".com" and ".co", numeric key "3" is assigned the sub-address ".net", numeric key "4" is assigned the sub-addresses ".org" and ".or", numeric key "5" is assigned the sub-addresses ".ac" and ".pe", numeric key "6" is assigned the sub-address ".kr", numeric key "7" is assigned the sub-addresses ".uk" and ".fr", numeric key "8" is assigned the sub-addresses ".es" and ".de", and numeric key "9" is assigned the sub-addresses ".cn" and ".jp".

Figure 4:
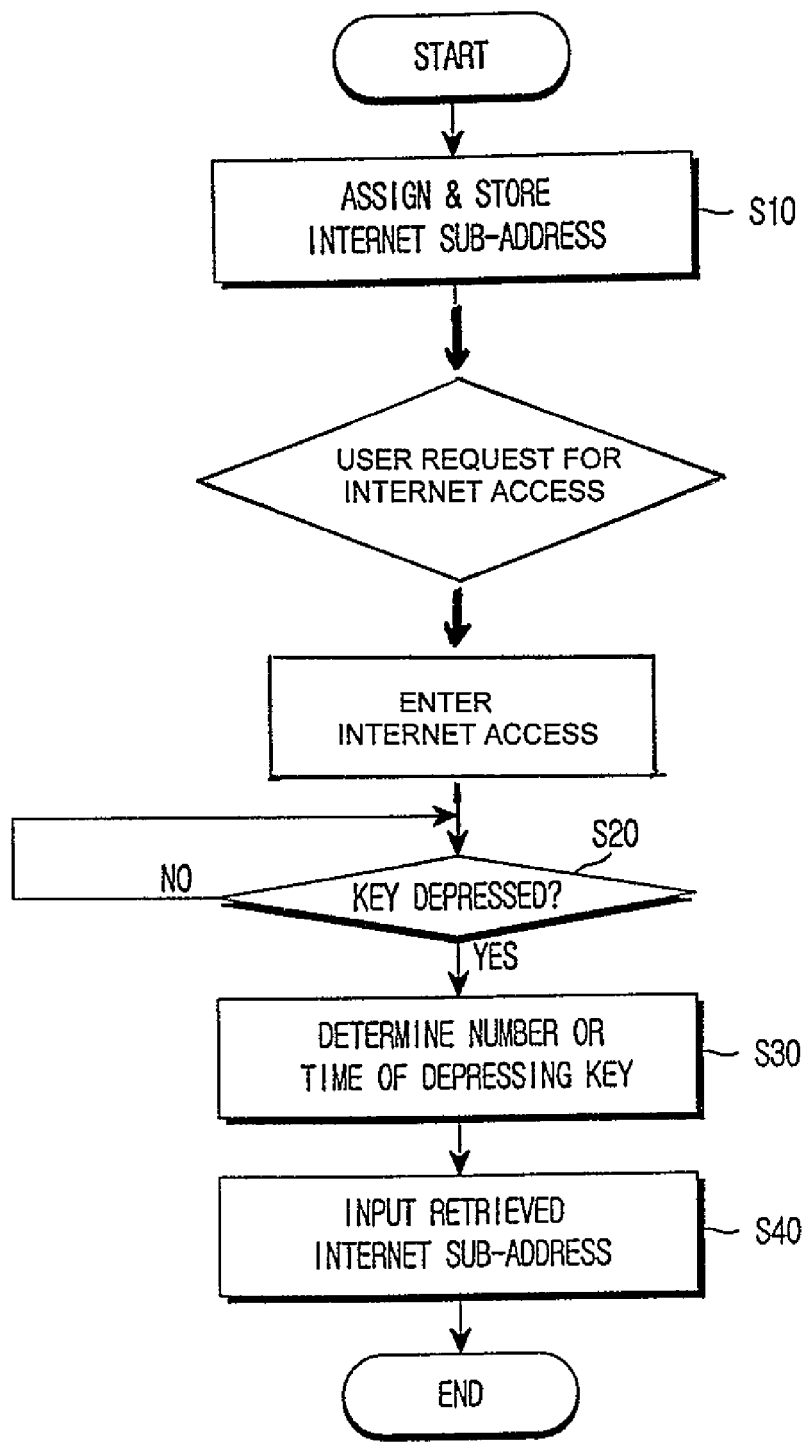
FIG. 4 is a flow chart showing the operation sequence of entering an Internet site address using the keypad of a mobile communication terminal according to a preferred embodiment of the present invention.

FIG. 4 is a flow chart diagram showing the operational sequence of entering an Internet site address using the keypad 17 of a mobile communication terminal according to a preferred embodiment of the present invention. Here, it should be noted that one full set of Internet site address consists of a plurality of its sub-addresses and the operational sequence for entering the Internet site address in the mobile terminal according to the present invention is achieved by execution of the program codes stored in the memory unit 18 by the controller 13 as shown in FIG. 2.

Referring again to FIG. 4, in step S10, at least one Internet sub-address and/or numeric or alphabetical character is/are respectively assigned to each one of a set of keys arranged on a keypad of the mobile terminal 10 on the basis of a predetermined order of arrangement and then stored into a specified area in the memory unit 18. Here, such Internet sub-addresses or characters assigned to the respective keys may be determined by a manufacturer. Alternatively, function keys (F1, F2, etc.) capable of storing frequently-used characters may be provided on a menu basis so that the user can store desired Internet sub-addresses or characters of site addresses in the function keys for future use. Thus, the user can edit and store Internet sub-address or domain names of specific sites in the function keys, in order to use the function keys in writing Internet addresses or transmitting E-mails.

Examples of Internet sub-addresses that may be assigned to individual keys are illustrated in FIG. 3.

In step S20, it is determined whether the user has depressed a key. If positive, then the controller 13 proceeds to step S30 to determine which key was depressed by the user and the number or time duration the individual key was depressed. Following such determination, which is typically indicated by either a long pause between key depressions or the selection of another key, the controller 13 transfers in step S40 the predetermined Internet sub-address corresponding to the number or time duration the key was depressed to the display unit 16.

Figure 5:
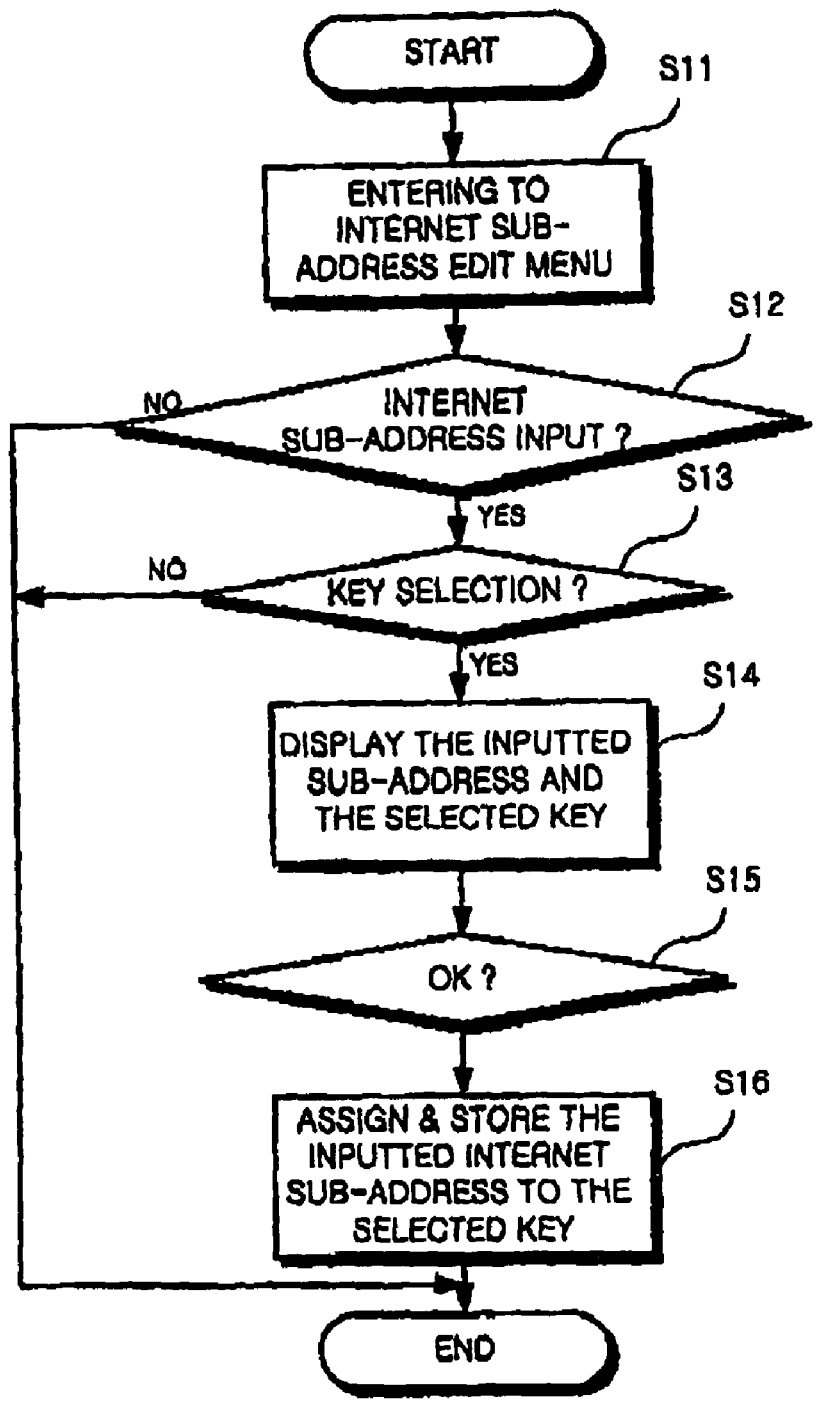
FIG. 5 is a flow chart showing the operation sequence of user assignment of internet subaddresses on an edit menu.

FIG. 5 is a detailed flowchart for illustrating an operation that a user assigns and stores internet sub-addresses, as an embodiment of the step S10. Here, a mobile communication terminal includes a menu capable of assigning and storing internet sub-addresses and the frequently-used characters. Hereinafter, the menu is called an internet sub-address edit menu.

Referring to the FIG. 5, if the user calls the internet sub-address edit menu by depressing a few of keys or the given frequently-used keys provided on a keypad, for example, the mobile communication terminal enters the internet sub-address edit menu in response to key manipulation of the user (S11). In the internet sub-address edit menu, the mobile communication terminal awaits assignment by the user of input characters into a specific key (S12). The desired characters may be the entire or part of an address of an internet sub-address or internet site. If the internet sub-address is input by the user, the mobile communication terminal awaits the user selection of a desired key for assigning the input internet sub-address (S13). The selected key is a numeric key on the keypad or a function key (for example, F1, F2 etc.) capable of assigning additional functions. The input internet sub-address and the selected key are displayed on a display unit of the mobile communication terminal (S14). If the user confirms information displayed in the display unit (S15), the mobile communication terminal stores the inputted internet sub-address corresponding to the selected key (S16).

According to a preferred embodiment of the present invention, the aforementioned Internet address inputting operation may be effected in the Internet address input mode only activated in response to a request of Internet accessing by a mobile subscriber. When the mobile terminal is not in the Internet address input mode, those Internet sub-addresses assigned to each key can be ignored by the controller, for the purpose of using the keypad pursuant to its conventional functionality.

A specific example of the key input operation according to the preferred embodiment of the present invention is provided below. For example, if a mobile subscriber desires to enter the specified Internet website address www.samsung.co.kr, using the keypad of the present invention as shown in FIG. 3, then 35 key strokes in total would be required in the following input sequence, shown below in Table 1.

TABLE 1

| KEY STROKES | COMMAND DISPLAY |
| --- | --- |
| 11 | www. |
| 77777 | s |
| 22 | a |
| 66 | m |
| 77777 | s |
| 888 | u |
| 666 | n |
| 44 | g |
| 222222 | .co |
| 66666 | .kr |

In this example, depressing numeric key 1 once would result in the number "1", and depressing it twice results in the display of "www." Likewise, depressing numeric key 7 once results in the display of the number "7", twice results in display of the letter "p", etc., so that depressing numeric key 7 five (5) times results in the display of the letter "s", as shown in Table 1. A similar display sequence is provided for the remaining keys as set forth in Table 1 to display and access "www.samsung.co.kr".

Figure 1:
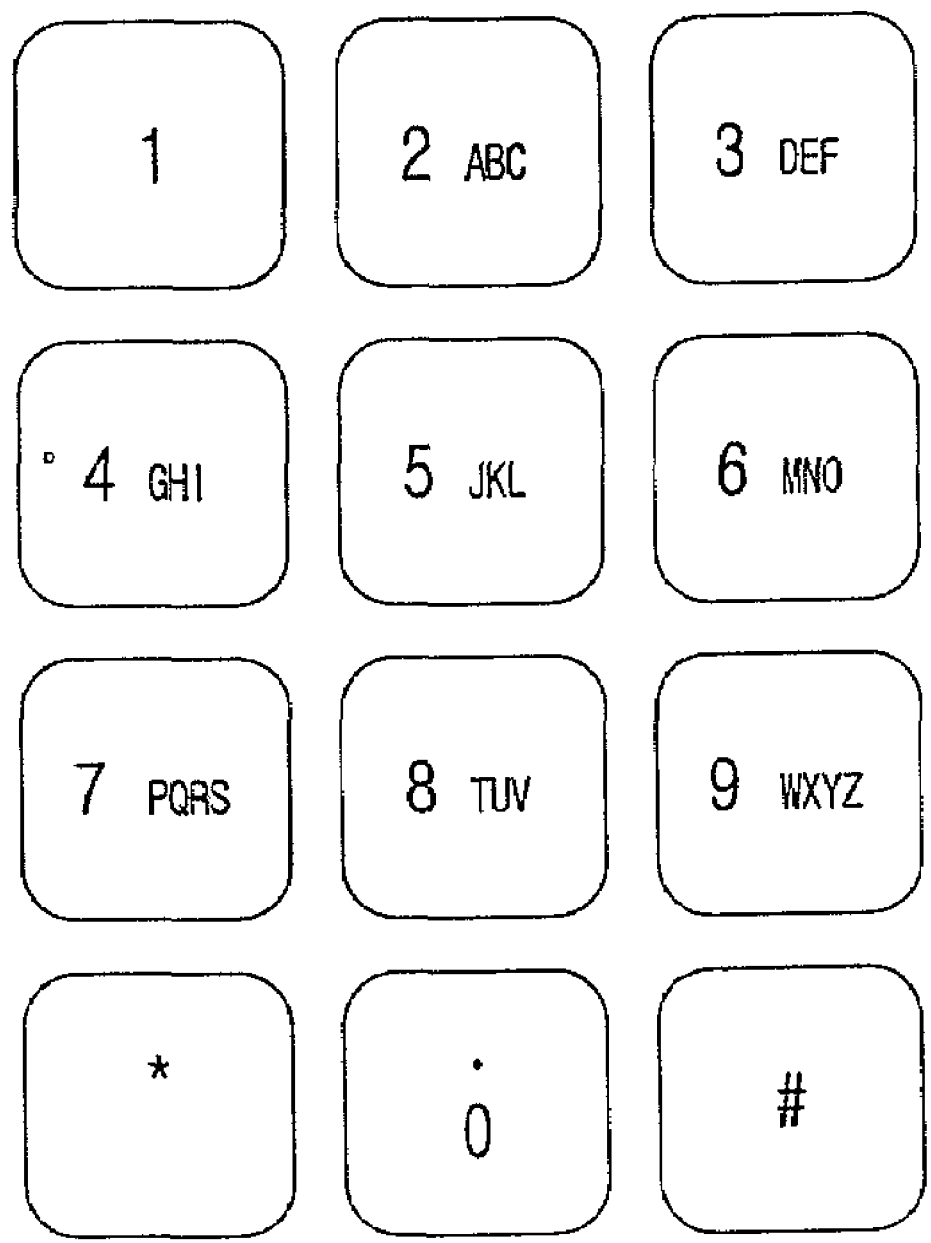
FIG. 1 is a schematic diagram showing the arrangement of a keypad provided in a prior art mobile communication terminal.

In contrast, the keypad arrangement as shown in FIG. 1 would require a total of 49 key strokes to enter the same Internet website address www.samsung.co.kr, as follows, shown below in Table 2.

TABLE 2

| KEY STROKE | COMMAND DISPLAY |
| --- | --- |
| 99 | w |
| 99 | w |
| 99 | w |
| 00 | . |
| 77777 | s |
| 22 | a |
| 66 | m |
| 77777 | s |
| 888 | u |
| 666 | n |
| 44 | g |
| 00 | . |
| 2222 | c |
| 6666 | o |
| 00 | . |
| 555 | k |
| 7777 | r |

Additionally, the keypad of the present invention is more convenient than the prior art keypad since it allows the same keys to be used repeatedly for different functions. For example, depressing key "1" twice yields "www.", depressing key "2" six times yields ".co", depressing key "6" five times yields ".kr", and so on. Table 3, below, provides a comparison of the number of key strokes necessary between the present invention and the prior art is made for entering some frequently used Internet sub-addresses:

TABLE 3

| Sub-address | Prior Art | Present Invention |
|---|---|---|
| www. | 8 | 2 |
| .com | 12 | 5 |
| .co | 10 | 6 |
| .kr | 9 | 5 |

As seen in the above table, a keypad according to the present invention provides a method for inputting Internet sub-addresses consisting of a plurality of alphabetical characters more conveniently and results in considerable reduction in the number of key strokes for entering the same sub-address in comparison to the prior art keypad. Furthermore, allowing repeated use of and assigning additional functionality to the same key button enables further reduction in its total input time for a specified website address as well as in the total required keyboard size.

As is apparent from the foregoing description, the present invention has an advantage of achieving a remarkable reduction in the total key input time required for entering a specified Internet website address to access via Internet network to a given website using a keypad with a limited number of keys, thereby providing the mobile subscriber with the ease and convenience in using of the mobile terminal.

While the invention has been shown and described with reference to a certain preferred embodiment thereof, it will be understood by those skilled in the art that various changes in form and details may be made therein without departing from the spirit and scope of the invention, as defined by the appended claims. For example, it should be noted that the Internet sub-address representing the country code may be assigned to a specified key in accordance with the country where the mobile terminal is being used.

What is claimed is:

1. A method for entering an Internet site address for accessing an Internet website using a keypad of a communication terminal having a display unit, comprising the steps of:
    assigning at least one Internet sub-address to one key of a plurality of keys arranged on the keypad;
    storing the assigned Internet sub-address associated with the key in a memory unit;
    receiving a user request for Internet access;
    entering an Internet access mode;
    detecting a depression of the key;
    determining a number of times that the key is depressed by a user of the mobile communication terminal, after at least one of a long pause before the key is subsequently depressed and another key is depressed;
    retrieving from the memory unit the stored Internet sub-address corresponding to the number of times the key is depressed; and
    transferring the retrieved Internet sub-address to the display unit for displaying said Internet site address on the display.

2. The method of claim 1, wherein the Internet sub-address includes a top level domain name.

3. The method of claim 1, wherein the Internet sub-address includes "www.".

4. The method of claim 1, wherein said Internet sub-address assigned to the plurality of keys of the keypad are defined by a manufacturer.

5. The method of claim 1, wherein said steps for entering the Internet site address are carried out in the Internet address input mode activated in response to the user's request for accessing an Internet website.

6. A method for entering an Internet site address including a plurality of Internet sub-addresses for accessing an Internet website using a keypad of a communication tenninal having a display, comprising:
    assigning to a plurality of keys arranged on the keypad at least one Internet sub-address and one or more characters and/or numerals, wherein the at least one Internet sub-address and the one or more characters and/or numerals that are assigned to a common key are each further assigned a number corresponding to a number of times that the common key is depressed;
    storing in a memory unit the assigned at least one Internet sub-address and the one or more characters and/or numerals assigned to the respective common key from the plurality of keys;
    receiving a user request for Internet access;
    entering an Internet access mode;
    detecting a depression of the key;
    determining the number of times that a key is depressed after at least one of a long pause before the key is subsequently depressed and another key is depressed;
    retrieving from the memory unit the stored at least one Internet sub-address or one or more characters and/or numerals assigned to the key, based on the number of times that the key is depressed; and
    transferring the retrieved at least one Internet sub-address or at least one or more characters and/or numerals for displaying said Internet site address on the display.

* * * * *